(12) United States Patent
Goto et al.

(10) Patent No.: US 6,426,311 B1
(45) Date of Patent: Jul. 30, 2002

(54) GLASS-CERAMICS

(75) Inventors: Naoyuki Goto, Machida; Mariko Kataoka; Toshitaka Yagi, both of Sagamihara, all of (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 107 days.

(21) Appl. No.: 09/663,727

(22) Filed: Sep. 15, 2000

(30) Foreign Application Priority Data

| Feb. 1, 2000 | (JP) | ................................. 2000-023871 |
| May 24, 2000 | (JP) | ................................. 2000-152961 |
| Jul. 21, 2000 | (JP) | ................................. 2000-220188 |

(51) Int. Cl.$^7$ ............................................. C03C 10/14
(52) U.S. Cl. ..................................... 501/4; 428/694 ST
(58) Field of Search ........................... 501/4; 428/694 ST

(56) References Cited

U.S. PATENT DOCUMENTS

| 4,239,521 | A |   | 12/1980 | Beall ................................. 65/33 |
| 5,567,217 | A | * | 10/1996 | Goto et al. ....................... 501/5 |
| 5,866,489 | A | * | 2/1999 | Yamaguchi ....................... 501/4 |
| 5,868,953 | A | * | 2/1999 | Mackawa et al. ............... 501/4 |
| 6,034,011 | A | * | 3/2000 | Yamaguchi et al. ............ 501/4 |
| 6,191,058 | B1 | * | 2/2001 | Yamaguchi ....................... 501/4 |
| 6,270,876 | B1 | * | 8/2001 | Abe et al. ......................... 501/4 |
| 6,344,423 | B2 | * | 2/2002 | Goto et al. ....................... 501/4 |

\* cited by examiner

Primary Examiner—Karl Group
(74) Attorney, Agent, or Firm—Hedman & Costigan, P.C.

(57) ABSTRACT

There are provided glass-ceramics containing, as a predominant crystal phase or phases, at least one selected from the group consisting of α-cristobalite, α-cristobalite solid solution, α-quartz and α-quartz solid solution, containing substantially no lithium disilicate ($Li_2O \cdot 2SiO_2$), lithium silicate ($Li_2O \cdot SiO_2$), β-spodumene, β-eucryptite, α-quartz, mica or fluorrichterite, containing substantially no Cr ingredient or Mn ingredient, and having average linear thermal expansion coefficient within a range from $+65 \times 10^{-7}/°$ C. to $+140 \times 10^{-7}/°$ C. within a temperature range from $-50°$ C. to $+70°$ C., said predominant crystal phase or phases having an average crystal grain diameter of less than 0.10 μm. The glass-ceramics are suitable for use as a substrate for an information storage medium and also for use as a substrate for a light filter.

8 Claims, No Drawings

GLASS-CERAMICS

BACKGROUND OF THE INVENTION

This invention relates to novel glass-ceramics which are light but have sufficient mechanical strength and light transmittance and also have a thermal expansion characteristic which is compatible with other materials. Particularly, the invention relates to glass-ceramics which are suitable for use both as a substrate for an information storage medium which requires a thermal expansion characteristic which is compatible with materials of component parts of a magnetic information storage device and super flatness which is suitable for a high density recording and as glass-ceramics for a light filter (particularly for WDM or DWDM light filter or gain-flattening filter) which requires excellent adhesion to a multi-layer film, proper thermal expansion characteristic and excellent light transmittance.

Recent multi-media tendency of personal computers and development of digital video cameras and digital cameras necessitate handling of a large amount of data such as moving pictures and voice and there is an increasing demand for an information storage device capable of recording information at a high recording density. For coping with such tendency, an information storage device is required to reduce the size of its bit cell for increasing the recording density. As the bit cell is reduced in size, a magnetic head is caused to operate in close proximity to the surface of an information storage medium such as a magnetic disk. As the magnetic head operates in a low glide height (near contact) state or in a contact state on the information storage medium, super flatness of the surface of the information storage medium becomes an important factor. On the other hand, in contrast to the conventional landing zone system, there is development of the ramp loading system according to which the magnetic head is in complete contact with the surface of the magnetic disk except when the magnetic head is started or stopped when the magnetic head. is moved out of the magnetic disk. Thus, there is an increasing demand for smoother surface of an information storage medium.

Further, as the amount of information to be handled increases, a finer, more accurate and thinner magnetic film is required and this necessitates a lower amount of elution of alkali ingredients (Li, Na and K) from the substrate.

Furthermore, there are new applications of such information storage medium to mobiles including APS cameras, cellular phones, digital cameras, digital video cameras and card drive, hard disk drives of mobile and desk top personal computers, hard disk drives of servers and new high recording density media including perpendicular magnetic recording medium, island magnetic recording medium and storage medium for a semiconductor memory. For coping with such new applications, higher physical, chemical and electrical properties are required for a substrate of an information storage medium.

An aluminum alloy has conventionally been used for a magnetic disk substrate. In the aluminum alloy substrate, however, projections or spot-like projections and depressions are produced on the surface of the substrate in the polishing process due to defects in the material and, therefore, is not sufficient in its flatness for a substrate for an information storage medium as described above. The aluminum alloy is a soft material having low Young's modulus and surface hardness and therefore vibration takes place during a high speed rotation of the drive which causes deformation of the medium. The aluminum alloy has also difficulty in thinning the substrate. Moreover, the aluminum alloy substrate tends to be damaged upon contact with the magnetic head. Accordingly, the aluminum alloy cannot cope sufficiently with the current requirements for the high density recording.

As a material which eliminates the defects of the aluminum alloy, there are known chemically tempered glasses such as alumino-silicate glass ($SiO_2$—$Al_2O_3$—$Na_2O$). The chemically tempered glasses, however, have the disadvantages that (1) since polishing is made after the chemically tempering process, the reinforced layer becomes instable in thinning the disk and (2) since the glasses contain $Li_2O$, $Na_2O$ or $K_2O$ ingredient as an essential ingredient, the film forming property is deteriorated and etching or all-surface barrier coating becomes necessary for preventing elution of such ingredient. Further, the chemically tempered glass substrate has slight undulation or the surface of the substrate and it is difficult to manufacture the product on a stable basis at a low cost.

For overcoming the defects of the chemically tempered glass substrates, some glass-ceramic substrates are known. The $SiO_2$—$Li_2O$—$Mgo$—$P_2O_5$ glass-ceramics disclosed in Japanese Patent Application Laid-open Publication No. 6-329440 is an excellent material as an all-surface textured material which contains, as predominant crystal phases, lithium disilicate ($Li_2O \cdot 2SiO_2$) and α-quartz (α-$SiO_2$) and in which the conventional mechanical or chemical texturing is obviated by controlling the size of the crystal grains of α-quartz and a surface roughness Ra (arithmetic mean roughness) is controlled within a range from 15 Å to 50 Å. However, surface roughness Ra which is sought today is 5.0 Å or below, preferably 3.0 Å or below and, more preferably, 2.0 Å or below and the prior art glass-ceramics cannot cope sufficiently with the low-glide height tendency accompanying the high density recording. Further, the prior art glass-ceramics contain lithium disilicate ($Li_2 \cdot 2SiO_2$) as a predominant crystal phase and no consideration has been given to the problems of elution of alkali ingredients and forming of small pits during polishing, though the amounts of alkali ingredients in the glass-ceramics is smaller than in the chemically tempered glasses.

The $SiO_2$—$Li_2O$—$K_2O$)—$MgO$—$ZnO$—$P_2O_5$—$Al_2O_3$ glass-ceramics or the $SiO_2$—$Li_2$—$K_2O$—$MgO$—$ZnO$—$P_2O_5$—$Al_2O_3$—$ZrO_2$ glass-ceramics disclosed in Japanese Patent Application Laid-open Publication No. 10-45426 are glass-ceramics for laser texturing containing, as a predominant crystal phase or phases, at least one of lithium disilicate ($Li_2O \cdot 2SiO_2$), a mixture of lithium disilicate and α-quartz, and a mixture of lithium disilicate and α-cristobalite (α-$SiO_2$). These glass-ceramics are not sufficient for coping with the low-glide height tendency resulting from the rapidly increasing recording capacity which requires the surface roughness Ra of 5.0 Å or below, preferably 3.0 Å or below and, more preferably 2.0 Å or below. Further, the glass-ceramics contain lithium disilicate as a predominant crystal phase and no consideration has been given to the problems of elution of alkali ingredients and forming of small pits during polishing which are sought to be solved today.

Japanese Patent Application Laid-open Publication No. 9-35234 discloses a magnetic disk substrate of $SiO_2$—$Al_2O_3$—$Li_{2O}$ glass-ceramics containing lithium disilicate and β-spodumene ($Li_2O \cdot Al_2O_3 \cdot 4SiO_2$) as predominant crystal phases. In the glass-ceramics, the predominant crystal phase is β-spodumene which has a negative thermal expansion characteristic with resulting low thermal expansion characteristic of the substrate and growth of crystal phases having positive thermal expansion characteristic such as α-quartz and α-cristobalite is restricted. As a result, the glass-ceramics have a surface roughness Ra after polishing of 20 Å (12 Å to 17 Å in the examples) which is still too rough for coping with the current requirement and cannot sufficiently cope with the low glide height tendency of the magnetic head resulting from increasing recording capacity. Further, the material which grows the crystal having the negative thermal expansion characteristic as a predominant crystal phase is apparently disadvantageous because it produces difference in the average linear thermal expansion coefficient relative to the component parts of the information storage device. Furthermore, the glass-ceramics require a high temperature of 820–920° C. for crystallization which is disadvantageous for a large scale production at a low cost and, moreover, the glass-ceramics contain lithium disilicate as a predominant crystal phase and no consideration has been given to the problems of elution of alkali ingredients and forming of small pits during polishing which are sought to be solved today.

International Publication No. WO97/01164 which includes the Japanese Patent Application Laid-open Publication No. 9-35234 discloses glass-ceramics for a magnetic disk in which the heat treatment for crystallization is made in a lower temperature range of 680–770° C. Improvement for the above described requirements is still insufficient in the glass-ceramics and the crystal phase of all examples of the glass-ceramics is β-eucryptite ($Li_2O \cdot Al_2O_3 \; 2SiO_2$) which has negative thermal expansion characteristic and therefore is disadvantageous because it produces difference in the average linear thermal expansion coefficient relative to the component parts of the information storage device. Moreover, the predominant crystal phase is lithium disilicate and no consideration has been given to the problems of elution of alkali ingredients and forming of small pits during polishing which are sought to be solved today.

Japanese Patent Application Laid-open Publication No. 11-343143 discloses $SiO_2$—$Al_2O_3$—Mgo—$Y_2O_3$—$TiO_2$—$Li_2O$ glass-ceramic substrate for an information storage medium containing, as a predominant crystal phase, quartz solution (MgO—$Al_2O_3$—$SiO_2$ quarts solid solution) including enstatite ($MgAl_2O_3$). Since the predominant crystal phase of the glass-ceramics is β-quartz solid solution which has a negative thermal expansion characteristic which produces a low expansion characteristic in the substrate, these glass-ceramics are entirely different from the glass-ceramics of the present invention which contain α-quartz or its solid solution, or α-cristobalite or its solid solution in respect of thermal expansion characteristic and, therefore, the desired average linear thermal expansion coefficient described in the present specification cannot be obtained.

Next to be described are materials for light filters. There are light filters which cut or pass light of a specific wavelength and there are also light filters which reduce intensity of light without depending upon wavelength. The former includes a band-pass filter which passes only a specific wavelength, a notch pass filter which cuts a specific wavelength and high-pass and low-pass filters which pass only wavelengths shorter or longer than a specific wavelength. The latter includes an ND filter.

Light filters can be classified also into an absorption type filter and an interference type filter. A representative absorption type filter is the ND filter and a representative interference type filter is the band-pass filter. A substrate made of plastic is used for absorption type filters such as those for photography. Since a substrate for light filters which are subject to a strong laser beam requires durability and heat resistance property, amorphous glass is exclusively employed for such substrate.

The band-pass filters are made by forming, on a substrate made of, e.g., glass, a multi-layer film of dielectric by alternately laminating an H layer of a dielectric thin film having a high refractive index and an L layer of a dielectric thin film having a low refractive index.

In a band-pass filter which is used for the WDM (wavelength division multiplexing) and the DWDM (dense wavelength division multiplexing) optical communication systems, temperature stability of the center wavelength of the band poses a problem when a narrow band width for passing wavelengths is set for applying the band-pass filter to transmitting and receiving a wavelength of a higher density. More specifically, the band-pass filter is a sensitive element in which the center frequency of the band varies even with a slight variation in temperature and, therefore, temperature compensation should be made by a temperature controller when the band-pass filter is used. Such temperature controller, however, cannot actually be employed because of limitation in the space where the band-pass filter is located. The temperature stability has become a matter of increasing importance since it is necessary to reduce the band width as the amount of light information increases.

In the past, amorphous glass has been used as a substrate for the band-pass filter as described above. This prior art substrate is not sufficient in its compressive stress to the film and its durability since its thermal expansion property and mechanical strength are not sufficiently high. Further, amorphous glass has a low surface hardness and, moreover, a relatively large amount of alkali ingredient must be added if a high thermal expansion property is to be provided and this poses a problem of elution of alkali ingredient during and after forming of the dielectric film on the substrate. Thus, amorphous glass cannot sufficiently satisfy the demands for a substrate for a light filter, particularly a substrate for a band-pass filter.

It is, therefore, an object of the invention to provide glass-ceramics suitable for use as a substrate for an information storage medium which have achieved super flatness required for coping with increased recording capacity of an information storage medium and which have solved the problem of elution of alkali ingredients in the substrate.

It is another object of the invention to provide glass-ceramics suitable for use as a substrate for a light filter which have a thermal expansion characteristic which is sufficient for avoiding variation in the center wavelength at a temperature at which a filter formed with a mono-layer or multi-layer film is used (i.e., having a high coefficient of thermal expansion and thereby imparting compressive stress to the film to improve temperature stability of the center wavelength of the film) and also have a mechanical property which imparts sufficient durability and processability to the filter and further have excellent light transmittance.

SUMMARY OF THE INVENTION

Accumulated studies and experiments made by the inventors of the present invention for achieving the above described objects of the invention have resulted in the finding, which has led to the present invention, that, by subjecting a specific base glass to specific heat treatments, glass-ceramics can be obtained which contain, as a predominant crystal phase or phases, at least one selected from the group consisting of α-cristobalite, α-cristobalite solid solution, α-quartz and α-quartz solid solution, contain substantially no lithium disilicate ($Li_2O \cdot 2SiO_2$), lithium silicate ($Li_2O \cdot SiO_2$), β-spodumene, β-eucryptite, β-quartz, mica or fluorrichterite, and contain substantially no Cr ingredient or Mn ingredient and, by virtue of this structure, are suitable for a substrate for an information storage medium which can solve the problems which are currently sought to be solved, namely the problem of reducing elution of alkali ingredients and the problem of occurrence of small pits on the surface of the substrate, can control crystal grains to a very fine grain diameter of less than 0.1 μm, can provide a surface flatness after polishing which is superior to the prior art glass-ceramics and can control its thermal expansion characteristic to be compatible with a thermal expansion characteristic of component parts of the information storage device. It has also been found that the glass-ceramics of the invention have a thermal expansion characteristic, mechanical strength and light transmittance which are very useful as a material of light filters, particularly WDM and DWDM band-pass filters and gain-flattening filters and, therefore, the glass-ceramics of the present invention are suitable for use as a substrate for light filters.

According to the invention, there are provided glass-ceramics containing, as a predominant crystal phase or phases, at least one selected from the group consisting of α-cristobalite, α-cristobalite solid solution, α-quartz and α-quartz solid solution, containing substantially no lithium disilicate ($Li_2O \cdot 2SiO_2$), lithium silicate ($Li_2O \cdot SiO_2$), β-spodumene, β-eucryptite, β-quartz, mica or fluorrichterite, containing substantially no Cr ingredient or Mn ingredient, and having average linear thermal expansion coefficient within a range from $+65 \times 10^{-7}/°$ C. to $+140 \times 10^{-7}/°$ C. within a temperature range from −50° C. to +70° C., said predominant crystal phase or phases having an average crystal grain diameter of less than 0.10 μm.

As used herein, "containing substantially no lithium disilicate ($Li_2O \cdot 2SiO_2$), lithium silicate ($Li_2O \cdot SiO_2$), β-spodumene, β-eucryptite, β-quartz, mica or fluorrichterite" indicates that the amount, if any, present of lithium disilicate or the other crystal mentioned is so small as to have no substantive effect upon the physical and chemical properties of the glass-ceramics. Such amounts contemplate that the degree of crystallization, i.e., the ratio of mass of the particular crystal in the glass-ceramics is less than 3%, preferably less than 1% or impurity levels. Further, as used herein, "containing substantially no Cr ingredient or Mn ingredient" indicates that the amount, if any, present of Cr ingredient or Mn ingredient is so small as to have no substantive effect upon the physical and chemical properties of the glass-ceramics. Such amounts contemplate impurity levels.

In one aspect of the invention, the glass-ceramics have Young's modulus of 80 GPa or over.

In another aspect of the invention, the glass-ceramics have specific gravity within a range from 2.3 to 2.7.

In another aspect of the invention, light transmittance of the glass-ceramics for plate thickness of 10 mm is 90% or over within a wavelength range from 950 nm to 1600 nm.

In another aspect of the invention, the glass-ceramics have bending strength of 250 MPa or over.

In another aspect of the invention, the glass-ceramics have Vickers hardness within a range from 600 to 800.

In another aspect of the invention, the glass-ceramics have a composition which comprises, in mass percent on oxide basis;

| | |
|---|---|
| $SiO_2$ | 65–75% |
| $Li_2O$ | 4–less than 7% |
| $K_2O$ | 0–3% |
| $Na_2O$ | 0–3% |
| $MgO + ZnO + SrO + BaO + CaO$ | 2–15% |
| $Y_2O_3 + WO_3 + La_2O_3 + Bi_2O_3$ | 0–3% |
| $SnO_2$ | 0–3% |
| $P_2O_5$ | 1–2.5% |
| $ZrO_2$ | 2–7% |
| $Al_2O_3$ | 5–9% |
| $Sb_2O_3 + As_2O_3$ | 0–1%. |

In another aspect of the invention, the glass-ceramics are produced by subjecting a base glass to heat-treatment at a temperature within a range from 400° C. to 600° C. for one to seven hours for nucleation and further heat-treatment at a temperature within a range from 650° C. to 750° C. for one to seven hours for crystallization.

DETAILED DESCRIPTION OF THE INVENTION

Reasons for limiting the predominant crystal phases, average crystal grain diameter, coefficient of average linear expansion, surface characteristic, composition, heat treatment conditions etc. will be described below. The composition of the glass-ceramics is expressed on the oxide basis in mass percent as in their base glasses. In the present specification, "predominant crystal phases" mean all crystal phases which have a relatively large precipitation ratio. More specifically, in X-ray chart used in X-ray diffraction analysis in which the ordinate represents X-ray diffraction intensity and the abscissa represents the diffraction angle, if the intensity of the main peak (highest peak) which indicates a crystal phase having the largest ratio of precipitation is assumed to be 100, a crystal phase whose main peak (i.e., the highest peak of the crystal phase) has a ratio of X-ray diffraction intensity (hereinafter referred to as "X-ray intensity ratio") of 30 or over is called "a predominant crystal phase".

For obtaining a desired coefficient of thermal expansion, a desirable glass-ceramic is one containing, as a predominant crystal phase or phases, at least one selected from the group consisting of α-cristobalite, α-cristobalite solid solution, α-quartz and α-quartz solid solution. By selecting one or more of these predominant crystal phases, a glass-ceramic having excellent chemical durability and physical properties can be easily produced. The X-ray intensity ratio of a crystal phase other than the above described predominant crystal phases should preferably be less than 20 and, more preferably, be less than 10 and, most preferably, be less than 5.

It has been found that, in the absence of lithium disilicate in the predominant crystal phase, it becomes possible to reduce occurrence of small pits in the surface portion of the substrate due to mechanical causes in the polishing process and, therefore, it is preferable that the glass-ceramics should not substantially contain lithium disilicate. It is also preferable for the glass-ceramics of the invention not to substantially contain β-spodumene, β-eucryptite or β-cristobalite (β-$SiO_2$) which has a negative thermal expansion characteristic, or lithium silicate ($Li_2O \cdot SiO_2$), diopside, enstatite, mica, α-tridymite or fluorrichterite.

Description will now be made about the average linear thermal expansion coefficient. As the recording density increases, positioning of the magnetic head relative to the magnetic information storage device requires a high precision and, therefore, a high precision size is required for the substrate and respective component parts for the device. Therefore, an influence of difference in the coefficient of thermal expansion between the substrate and the component parts for the device cannot be ignored and difference in the coefficient of thermal expansion must be reduced to the maximum extent possible. More precisely, there is a case where it is preferable that a coefficient of thermal expansion of the substrate is only slightly larger than a coefficient of thermal expansion of the component parts of the drive device. As component parts for a small size magnetic information storage medium, ones having a coefficient of thermal expansion in a range from $+90\times10^{-7}/°$ C. to $+100\times10^{-7}/°$ C. are frequently used so that the substrate needs to have a coefficient of thermal expansion of this range. However, there are disk drive manufacturers who use, as materials of component parts, materials having a coefficient of thermal expansion which is outside of the above range, i.e., a coefficient of thermal expansion within a range from about $+60\times10^{-7}/°$ C. to about $+135\times10^{-7}/°$ C. For this reason, in the crystal system of the present invention, a range of average linear thermal expansion coefficient has been determined so that the substrate will be applicable to as wide a variety of materials of component parts as possible while having sufficient regard to the strength of the substrate. It has been found that the average linear thermal expansion coefficient should preferably be within a range from $+65\times10^{-7}/°$ C. to $+140\times10^{-7}/°$ C. within a temperature range from $-50°$ C. to $+70°$ C. A more preferable range of the average linear thermal expansion coefficient within the same temperature range is from $+70\times10^{-7}/°$ C. to $+120\times10^{-7}/°$ C.

From the standpoint of glass-ceramics for a light filter, as described previously, the temperature stability of the center wavelength of the band is very important and glass-ceramics having a larger coefficient of thermal expansion than a material which constitutes the film are required. The reason will be described below.

In the band-pass filter and the gain-flattening filter, the temperature stability of the center wavelength depends to some extent on refractive index temperature coefficient of a dielectric which constitutes the thin film and, to a larger extent than that, on a coefficient of thermal expansion of the substrate. This is because refractive index is determined by a film atomic density of the thin film. That is, the higher the film atomic density of the thin film is, the smaller becomes variation caused by the temperature of the center frequency. The film atomic density of the thin film is greatly influenced by the coefficient of thermal expansion of the substrate for the light filter on which the thin film is formed. More specifically, the temperature of the substrate during the film forming process becomes about 200° C. and the substrate thereby is considerably expanded. The thin film is formed on this expanded substrate and, as the substrate is cooled, the thin film is subjected to compressive stress due to difference in the coefficient of thermal expansion between them. As a result, the film atomic density of the thin film increases and the refractive index thereby increases. The temperature stability of the center frequency of transmitted light therefore increases. The amount of change in the refractive index is saturated in a range of stress exceeding a certain value so that the ratio of increase in the refractive index becomes small even if the compressive stress increases in this range. For this reason, the larger the coefficient of thermal expansion of the substrate, the larger the compressive stress applied to the dielectric thin film formed on the substrate with the result that variation in the refractive index due to temperature at which the filter is used decreases. For this reason, it is desirable to set the coefficient of thermal expansion of the glass-ceramics at a larger value than the coefficient of thermal expansion of the dielectric thin film when the temperature stability of the center frequency is taken into consideration.

The studies and experiments conducted by the inventors of the present invention have resulted in the finding that, if the coefficient of thermal expansion within the temperature range from $-20°$ C. to $+70°$ C. is $65\times10^{-7}/°$ C. or over, sufficient compression stress can be imparted to the film within a temperature range in which the glass-ceramics are used as a band-pass filter and gain-flattening filter and that, if the coefficient of thermal expansion exceeds $140\times10^{-7}/°$ C., difference in the coefficient of thermal expansion between the substrate and the film becomes so large that problems such as separation of the film from the substrate take place. A preferable range of the coefficient of thermal expansion is $90\times10^{-7}/°$ C. to $130\times10^{-7}/°$ C. and a more preferable range thereof is $95\times10^{-7}/°$ C. to $125\times10^{-7}/°$ C.

The average crystal grain diameter of the predominant crystal phase will now be described. As described previously, the increase in the surface recording density in an information storage medium has brought about development of the near contact recording system in which the glide height of the magnetic head is 0.025 μm or below or the contact recording system in which the magnetic head operates in complete contact with the surface of the information storage medium. For coping with such tendency, the information storage medium must have superior flatness to the conventional media. If one attempts to achieve input and output of information with a high recording density on a magnetic recording medium having the conventional level of flatness, input and output of magnetic signals cannot be made because the distance between the magnetic head and the surface of the magnetic recording medium is too large. If this distance is reduced, there will occur collision of the magnetic head against projections of the surface of the medium resulting in damage to the magnetic head or medium. For preventing occurrence of damage to the magnetic head or medium even in such low glide height or complete contact of the magnetic head, it has been found that the surface roughness Ra (arithmetic mean roughness) of an information storage medium should preferably be 5.0 Å or below, more preferably be 3.0 Å or below and most preferably be 2.0 Å or below. For obtaining such super flat polished surface, the average crystal grain diameter of the predominant crystal phase should preferably be 0.10 μm or below, more preferably be 0.05 μm or below and most preferably be 0.02 μm or below. By uniform precipitation of fine crystals, mechanical strength of the glass-ceramics can be increased. Since the precipitated crystals prevent growth of microcracks, small chipping such as one occurring during polishing of the substrate can be significantly reduced. When the glass-ceramics are used for a light filter, fine crystals improve light transmittance. From the standpoint of using the glass-ceramics for a light filter, the average crystal grain diameter should preferably be 0.10 μm or below and, more preferably be 0.05 μm or below and most preferably be 0.02 μm or below. Description will now be made about mechanical strength, i.e., Young's modulus and bending strength. When glass-ceramics are used for a substrate of a magnetic disk, these mechanical strength factors are important. As the recording density increases, the disk itself must be rotated at a high speed. For reducing vibration of the disk caused by such high speed rotation, Young's modulus should preferably be 80 GPa or over and bending strength should preferably be 250 MPa or over. From the standpoint of using the glass-ceramics for a light filter, it is desirable that the glass-ceramics should have high Young's modulus and bending strength. Particularly, when the glass-ceramics are used for WDM filters, the glass-ceramics are processed to small chips having a size of 2 mm or below×2 mm or below×2 mm or below and, therefore, the processing for obtaining such small chips becomes difficult, if the glass-ceramics have not sufficient Young's modulus and bending strength. Therefore, from this standpoint also, the glass-ceramics should preferably have Young's modulus of 80 GPa or over and bending strength of 250 MPa or over. More preferable Young's modulus is 85 GPa and more preferable bending strength is 290 MPa. Most preferable bending strength is 300 MPa.

From the standpoint of using the glass-ceramics for a light filter, if light transmittance is low, inconveniences such as reduction in the signal-to-noise ratio will take place in producing signals. It is therefore desirable that light transmittance should be as large as possible and it has been found that light transmittance of 90% at the minimum is necessary. The wavelength range used for the band-pass filter and gain-flattening filter is 950 nm to 1600 nm and light transmittance of 90% or over for plate thickness of 10 mm is required for this wavelength range. As to light transmittance within this wavelength range, light transmittance should preferably be 95% or over and, more preferably, 97% or over.

For achieving a high speed rotation in an information storage device, specific gravity, in addition to Young's modulus, is an important factor. If specific gravity is excessively large, vibration tends to occur during a high speed rotation even if Young's modulus is sufficiently high. If specific gravity is excessively low, it becomes difficult to achieve desired mechanical strength, particularly Young's modulus. Having regard to balance between Young's modulus and specific gravity, the ratio of Young's modulus to specific gravity (Young's modulus/specific gravity) should preferably be 30–65(GPa) and, more preferably be 33–60 (GPa).

When glass-ceramics are used for a substrate of an information storage medium, they tend to be vulnerable to scratches and, therefore, they cannot be used as a substrate for an information storage medium unless they have Vickers hardness of a certain value. If, however, Vickers hardness is too high, the glass-ceramics cannot be processed easily. Having regard to balance of these factors, it is preferable for glass-ceramics to have Vickers hardness within a range from 600 to 800. From the standpoint of using the glass-ceramics for a light filter, if Vickers hardness is too small, the substrate tends to be vulnerable to scratches with the result that transmitted light scatters in the portions of the substrate having scratches thereby deteriorating the function of the light filter. If Vickers hardness is too large, there occurs the problem of processability and, particularly, cracking or chipping tends to occur when the glass-ceramics are processed to small chips. Having regard to balance between these factors, it is preferable for the glass-ceramics to have Vickers hardness within a range from 600 to 800 and preferably within a range from 650 to 760.

Reasons for limiting the composition range of the base glass as described above will now be described.

The $SiO_2$ ingredient is a very important ingredient in that, by heating a base glass, it forms α-cristobalite, α-cristobalite solid solution, α-quartz and α-quartz solid solution as predominant crystal phases. If the amount of this ingredient is below 65%, the crystal phases which have grown in the glass-ceramics are instable and their texture tends to become too rough whereas if the amount of this ingredient exceeds 75%, difficulty arises in melting and forming of the base glass. A preferable amount of this ingredient is more than 65% and/or up to 75%. A more preferable range of this ingredient is 68–74%.

The $Li_2O$ ingredient is an important ingredient for improving the melting property of the base glass. If the amount of this ingredient is below 4%, this effect cannot be achieved with the result that difficulty arises in melting the base glass. If the amount of this ingredient exceeds 7%, there arises elution of Li ion and increase in precipitation of lithium disilicate crystal. A more preferable range of this ingredient is from 4.5% to 6.5% and the most preferable range thereof is from 4.5% to 6.0%.

The $K_2O$ and $Na_2O$ ingredients are effective for reducing the melting temperature and, moreover, are effective for preventing elution of alkali ions from the glass matrix when these ingredients coexist with the $Li_2O$ ingredient. This is because the electric property (more specifically volume resistivity) of the glass-ceramics is improved by mixing and coexistence of small amounts of these alkali ingredients. More specifically, by adding the $K_2O$ and $Na_2O$ ingredients to a glass containing a relatively large amount of the $Li_2O$ ingredient to cause these ingredients to coexist, volume resistivity is improved and movement of alkali ions in the glass is thereby restricted with resulting prevention of elution of alkali ions in the glass. As to the amounts of these ingredients, up to 3% of $K_2O$ and up to 3% of $Na_2O$ will suffice. It has been found that addition of these ingredients exceeding 3% each will increase elution of alkali rather than decrease it. A preferable range of each of the $K_2O$ and $Na_2O$ ingredients is 0 to less than 3%. A more preferable range of the $K_2O$ ingredient is 0.1–2.5% and a more preferable range of the $Na_2O$ ingredient is 0–2.5%.

The MgO, ZnO, SrO, BaO and CaO ingredients are effective for improving the melting property of the glass and preventing the texture of the crystal grown from becoming too rough. The total amount of these ingredients should preferably be 2% or over but, if the total amount of these ingredients exceeds 15%, the crystal grown becomes instable and the texture becomes too rough.

The $P_2O_5$ ingredient is indispensable as a nucleating agent. For enhancing nucleation and preventing the texture of the crystal grown from becoming too rough, the amount of this ingredient should preferably be 1.0% or more. For preventing the base glass from becoming opaque (or devitrification) and maintaining stable production in a large scale, the amount of this ingredient should preferably be 2.5% or below.

The $ZrO_2$ ingredient is a very important ingredient which, like $P_2O_5$ ingredient, functions as a nucleating agent for the glass and also is effective for making the grown crystal grains finer and improving mechanical strength and chemical durability of the material. For achieving these effects, a preferable amount of this ingredient is 2% or over. If an excessive amount of this ingredient is added, difficulty arises in melting the base glass and a material such as $ZrSiO_4$ is left unmelted. For this reason, the amount of this ingredient should preferably be limited to 7% or below. A preferable range of this ingredient is 2–6% and a more preferable upper limit of this ingredient is up to 5%.

The $SnO_2$ ingredient is an ingredient which, like the $ZrO_2$ ingredient, functions as a nucleating agent for the glass. Addition of this ingredient up to 3% will suffice.

The $Al_2O_3$ ingredient is an ingredient which improves chemical durability and mechanical strength, particularly hardness of the glass-ceramics and an amount of 5% or over of this ingredient should preferably be added. If an excessive amount of this ingredient is added, the melting property and resistance to devitrification of the glass deteriorate and, moreover, the crystal grown becomes β-spodumene ($Li_2O \cdot Al_2O_3 \cdot 4SiO2$) which is a crystal of a low thermal expansion characteristic. Since precipitation of β-spodumene significantly decreases the average linear thermal expansion coefficient of the material, precipitation of this crystal should be avoided as possible. For this reason, the amount of this ingredient should preferably be limited to 9% or below. More preferably, the lower limit of this ingredient should be more than 5% and the upper limit should be less than 9%. Most preferably, the lower limit of this ingredient should be more than 6% and the upper limit should be less than 8%.

The $Y_2O_3$, $WO_3$, $La_2O_3$ and $Bi_2O_3$ ingredients may be added for improving the melting property which tends to decrease in a composition in which the content of the $Li_2O$ ingredient is relatively low and also for increasing Young's modulus of the glass. The total amount of up to 3% of these ingredients will suffice. If the total amount of these ingredients exceeds 3%, stable precipitation of the desired crystals becomes difficult.

The $Sb_2O_3$ and $As_2O_3$ ingredients may be added as a refining agent.

Addition of a total sum of one or both of these ingredients up to 1% will suffice.

Ga, Ge, Cu, Fe, Co, Nb, Ti, V, Ce, Gd or B in an amount up to 3% (mass % on oxide basis) may be added to the extent not to impair the required properties of the glass-ceramics. The glass-ceramics preferably should not substantially contain Mo, Ta, Mn, Cr or F.

For manufacturing the glass-ceramics of the present invention, the base glass having the above described composition is melted, is subjected to heat forming and/or cold forming, is heat treated for producing a crystal nucleus under a temperature within a range from 400° C. to 600° C. for about one to seven hours, and further is heat treated for crystallization under a temperature within a range from 650° C. to 750° C. for about one to seven hours.

The glass-ceramics thus obtained by the heat treatment had, as their predominant crystal phase or phases, at least one selected from the group consisting of α-cristobalite, α-cristobalite solid solution, α-quartz and α-quartz solid solution. The average crystal grain diameter of the crystal phase is less than 0.10 μm.

By lapping and polishing the glass-ceramics thus obtained by a conventional method, glass-ceramics having surface roughness Ra within a range from 1.0 Å to 5.0 Å are provided. A magnetic information storage disk is obtained by forming a magnetic film and, if necessary, other layers including Ni-P plating, an undercoat layer, a protective layer and a lubricating layer, on the glass-ceramic substrate. As regards a light filter, by forming a $Ta_2O_5/SiO_2$ multi-layer film on the glass-ceramic substrate material after polishing and processing the substrate material to chips having a size of 1 mm×1 mm×1 mm, light filters having a smaller variation in the center wavelength due to temperature change than the prior art light filters and therefore having excellent wavelength resolution are provided. These light filters are suitable for use as band-pass filters and gain-flattening filters.

EXAMPLE

Examples of the glass-ceramics of the invention will now be described.

Tables 1–4 show compositions of Examples No. 1 to No. 10 of the glass-ceramics of the invention and two comparative examples of the prior art $Li_2O \cdot SiO_2$ glass-ceramics (Comparative Example No. 1 is the glass-ceramics disclosed in Japanese Patent Application Laid-open Publication No. 62-72547 and Comparative Example No. 2 is the glass-ceramics disclosed in Japanese Patent Application Laid-open Publication No. 9-35234 ) together with their nucleation temperature, crystallization temperature, crystal phases, average crystal grain diameter, average linear thermal expansion coefficient (temperature range from −50° C. to +70° C.), specific gravity and surface roughness Ra (arithmetic mean roughness) after polishing. In the tables, a -cristobalite solid solution is described as "α-cris. SS" and α-quartz solid solution as "α-quartz SS".

For manufacturing the glass-ceramic substrate of the above described examples, materials including oxides, carbonates and nitrates are mixed and molten in conventional melting apparatus at a temperature within the range from about 1350° C. to about 1450° C. The molten glass is stirred to homogenize it and thereafter formed into a disk shape and annealed to provide a formed glass. Then, the formed glass is subjected to heat treatment to produce the crystal nucleus under a temperature within the range from 400° C. to 600° C. for about one to seven hours and then is further subjected to heat treatment for crystallization under a temperature within the range from 650° C. to 750° C. for about one to seven hours to obtain a desired glass-ceramic. Then, this glass-ceramic is lapped with diamond pellets of 800# to 2000# for about 5 minutes to 30 minutes and then is finally polished with a cerium oxide polishing agent having grain diameter ranging from 0.02 μm to 3 μm for about 30 minutes to 60 minutes.

The crystal grain diameter (average) of the respective crystal phases were measured by a transmission electron microscope (TEM). The types of the respective crystal grains were identified by the X-ray diffractometer (XRD).

The surface roughness Ra (arithmetic mean roughness) was measured with an atomic force microscope (AFM).

The amount of elution of Li ion was measured by the ion chromatography. The measurement was made by packing 80 ml of ultrapure water (at room temperature) and a disk having diameter of 65 mm and thickness of 0.635 mm in a film pack, holding this film pack in a drier warmed at about 30° C. for three hours and thereafter taking out the disk for ion chromatography.

The average linear thermal expansion coefficient was measured in accordance with JOGIS (Japan Optical Glass Industry Standard) 16. Young's modulus was measured by the ultrasonic pulse technique according to JIS R1602. The bending strength was measured in accordance with JIS R1601 (three-point bending strength). Vickers hardness was measured in accordance with JIS R1610. Light transmittance for plate thickness of 10 mm within a wavelength range from 950 nm to 1600 nm was measured by a spectrophotometer. Specific gravity was measured in accordance with JOGIS 05.

TABLE 1

|  | Example | | |
| --- | --- | --- | --- |
|  | 1 | 2 | 3 |
| $SiO_2$ | 73.3 | 75.0 | 69.2 |
| $Li_2O$ | 5.0 | 5.5 | 5.0 |

TABLE 1-continued

| | Example | | |
|---|---|---|---|
| | 1 | 2 | 3 |
| P$_2$O$_5$ | 2.0 | 2.1 | 2.0 |
| ZrO$_2$ | 2.4 | 4.0 | 2.4 |
| Al$_2$O$_3$ | 7.5 | 7.5 | 7.5 |
| MgO | 0.8 | 1.8 | 1.4 |
| ZnO | 4.0 | 0.5 | 6.0 |
| SrO | 1.0 | 0.6 | 2.0 |
| BaO | 1.0 | 0.5 | 2.0 |
| Y$_2$O$_3$ | | | |
| WO$_3$ | | | |
| La$_2$O$_3$ | | | |
| Bi$_2$O$_3$ | | | |
| K$_2$O | 2.0 | 2.0 | 2.0 |
| Na$_2$O | | | |
| Sb$_2$O$_3$ | | 1.0 | 0.5 |
| Nucleation temperature(° C.) | 550 | 560 | 540 |
| Crystallization temperature(° C.) | 710 | 750 | 720 |
| Predominant crystal phase | α-cris. SS | α-cris. SS | α-cris. SS |
| Average grain diameter | <0.01 μm | <0.01 μm | <0.01 μm α-quartz SS 0.01 μm |
| Average linear thermal expansion coefficient (× 10$^{-7}$/° C.) | 72 | 110 | 100 |
| light transmittance (%) | 99.0 | 91.0 | 99.0 |
| Young's modulus (GPa) | 82 | 89 | 81 |
| Bending strength (MPa) | 290 | 400 | 350 |
| Vickers hardness | 760 | 740 | 740 |
| Surface roughness Ra (Å) | 1.0 | 2.2 | 2.0 |
| Specific gravity | 2.43 | 2.48 | 2.44 |
| Li ion elution (μg/disk) | 0.31 | 0.38 | 0.28 |
| (μg/cm$^2$) | 0.0046 | 0.056 | 0.0041 |

TABLE 2

| | Example | | |
|---|---|---|---|
| | 4 | 5 | 6 |
| SiO$_2$ | 63.9 | 63.9 | 66.9 |
| Li$_2$O | 6.0 | 6.0 | 6.0 |
| P$_2$O$_5$ | 2.5 | 2.5 | 2.5 |
| ZrO$_2$ | 2.4 | 2.4 | 2.4 |
| Al$_2$O$_3$ | 7.5 | 7.5 | 5.5 |
| MgO | 2.0 | 2.0 | 2.0 |
| ZnO | 6.0 | 6.0 | 6.0 |
| SrO | 1.7 | 1.7 | 1.7 |
| BaO | 2.6 | 2.6 | 2.6 |
| Y$_2$O$_3$ | GeO$_2$ = 3.0 | Gd$_2$O$_3$ = 3.0 | Ga$_2$O$_3$ = 2.0 |
| WO$_3$ | | | |
| La$_2$O$_3$ | | | |
| Bi$_2$O$_3$ | | | |
| K$_2$O | 2.0 | 2.0 | 2.0 |
| Na$_2$O | | | |
| Sb$_2$O$_3$ | 0.4 | 0.4 | 0.4 |
| Nucleation temperature(° C.) | 550 | 560 | 540 |
| Crystallization temperature(° C.) | 710 | 750 | 720 |
| Predominant crystal phase | α-cris. SS | α-cris. SS | α-cris. SS |
| Average grain diameter | <0.01 μm | <0.01 μm | <0.01 μm |
| Average linear thermal expansion coefficient (× 10$^{-7}$/° C.) | 74 | 100 | 93 |
| light transmittance (%) | 99.0 | 99.0 | 99.0 |
| Young's modulus (GPa) | 82 | 89 | 81 |
| Bending strength (MPa) | 400 | 500 | 450 |
| Vickers hardness | 740 | 740 | 740 |
| Surface roughness Ra (Å) | 1.0 | 2.2 | 2.0 |
| Specific gravity | 2.45 | 2.48 | 2.44 |
| Li ion elution (μg/disk) | 0.22 | 0.23 | 0.19 |
| (μg/cm$^2$) | 0.0033 | 0.0034 | 0.0028 |

TABLE 3

| | Example | | |
|---|---|---|---|
| | 7 | 8 | 9 |
| SiO$_2$ | 68.2 | 69.1 | 69.0 |
| Li$_2$O | 5.0 | 5.0 | 5.0 |
| P$_2$O$_5$ | 2.0 | 2.0 | 2.0 |
| ZrO$_2$ | 2.4 | 2.4 | 2.0 |
| Al$_2$O$_3$ | 7.0 | 7.0 | 7.1 |
| MgO | 1.4 | 1.0 | 1.4 |
| ZnO | 6.0 | 7.0 | 6.0 |
| SrO | 2.0 | 2.0 | 2.0 |
| BaO | 2.0 | 2.0 | 2.0 |
| Y$_2$O$_3$ | 1.0 | | |
| WO$_3$ | | | 0.5 |
| La$_2$O$_3$ | | | |
| Bi$_2$O$_3$ | | | 0.5 |
| K$_2$O | 2.0 | 2.0 | 2.0 |
| Na$_2$O | 0.5 | | |
| Sb$_2$O$_3$ | | | |
| As$_2$O$_3$ | 0.5 | 0.5 | 0.5 |
| Nucleation temperature(° C.) | 480 | 470 | 500 |
| Crystallization temperature(° C.) | 715 | 720 | 730 |
| Predominant crystal phase | α-cris. SS | α-cris. SS | α-cris. SS |
| Average grain diameter | <0.01 μm | <0.01 μm | <0.01 μm α-quartz SS 0.01 μm |
| Average linear thermal expansion coefficient (× 10$^{-7}$/° C.) | 85 | 110 | 104 |
| light transmittance (%) | 99.5 | 92.0 | 99.5 |
| Young's modulus (GPa) | 85 | 98 | 90 |
| Bending strength (MPa) | 300 | 550 | 360 |
| Vickers hardness | 740 | 730 | 760 |
| Surface roughness Ra (Å) | 1.0 | 2.2 | 2.0 |
| Specific gravity | 2.45 | 2.43 | 2.46 |
| Li ion elution (μg/disk) | 0.32 | 0.27 | 0.25 |
| (μg/cm$^2$) | 0.0047 | 0.0040 | 0.0037 |

TABLE 4

| | Example | Comparative Example | |
|---|---|---|---|
| | 10 | 1 | 2 |
| SiO$_2$ | 69.1 | 74.2 | 76.1 |
| Li$_2$O | 5.0 | 9.6 | 11.8 |
| P$_2$O$_5$ | 2.0 | 1.5 | 2.0 |
| ZrO$_2$ | 2.4 | 0.4 | — |
| Al$_2$O$_3$ | 7.0 | 9.6 | 7.1 |
| MgO | 1.0 | PbO = 2.3 | — |
| ZnO | 7.0 | — | — |
| SrO | 1.5 | | |
| BaO | 1.5 | | |
| Y$_2$O$_3$ | | | |
| WO$_3$ | 0.5 | | |
| La$_2$O$_3$ | 0.5 | | |
| Bi$_2$O$_3$ | | | |
| K$_2$O | 2.0 | 2.4 | 2.8 |
| Na$_2$O | | | |
| Sb$_2$O$_3$ | | | 0.2 |
| As$_2$O$_3$ | 0.5 | | |
| Nucleation temperature(° C.) | 470 | 540 | 500 |
| Crystallization temperature(° C.) | 720 | 800 | 850 |
| Predominant crystal phase | α-cris. SS | lithium disilicate | lithium disilicate |
| Average grain diameter | <0.01 μm α-quartz SS 0.01 μm | 1.5 μm α-cristobalite 0.3 μm | 0.1 μm β-spodumene 0.2 μm |
| Average linear thermal expansion coefficient (× 10$^{-7}$/° C.) | 94 | 48 | 49 |
| light transmittance (%) | 97.0 | 74 | 60 |
| Young's modulus (GPa) | 97 | 80 | 86 |
| Bending strength (MPa) | 600 | 180 | 200 |

TABLE 4-continued

|  | Example | Comparative Example | |
| --- | --- | --- | --- |
|  | 10 | 1 | 2 |
| Vickers hardness | 750 | 800 | 850 |
| Surface roughness Ra (Å) | 2.0 | 12 | 11 |
| Specific gravity | 2.50 | 9.46 | 2.55 |
| Li ion elution (μg/disk) | 0.32 | 3.00 | 3.80 |
| (μg/cm$^2$) | 0.0047 | 0.0443 | 0.0562 |

As shown in Tables 1 to 4, the glass-ceramics of the present invention are different from the comparative examples of the prior art Li$_2$O·SiO$_2$ system glass-ceramics in the predominant crystal phase. The glass-ceramics of the present invention does not contain lithium disilicate (Li$_2$Si$_2$O$_5$) but contains at least one crystal phase selected from the group consisting of α-cristobalite (α-SiO$_2$), α-cristobalite solid solution (α-SiO$_2$ solid solution), α-quartz (α-SiO$_2$) and α-quartz solid solution (α-SiO$_2$ solid solution). In the glass-ceramic of Comparative Example 1, the lithium disilicate crystal phase has a large grain diameter (average) of 1.5 μm or over and, in the glass-ceramic of Comparative Example 2, the β-spodumene crystal phase has also a large grain diameter (average) of 0.2 μm. The crystal grains of these comparative examples are all of an acicular or rice grain shape. In view of the current tendency toward the super flatness, the glass-ceramics of the comparative examples will cause difficulty in the surface roughness after polishing and cause other defects. The glass-ceramics of Comparative Examples 1 and 2 have surface roughness Ra of 11 Å and over which shows that it is extremely difficult in the comparative examples to obtain an excellent flat surface characteristic required (i.e., Ra of 5 Å or below).

Further, as regards the thermal expansion characteristic, the glass-ceramics of the Comparative Examples 1 and 2 have low average linear thermal expansion coefficients of 48×10$^{-7}$/° C. and 49×10$^{-7}$/° C. which are quite unsuitable for a substrate for an information storage medium or a substrate for a light filter.

On the glass-ceramics of the above described examples are formed films of a Cr middle layer (80 nm), a Co—Cr magnetic layer (50 nm) and a SiC protective layer (10 nm) by the DC sputtering method. Then, a perfluoropolyether lubricant (5 nm) is coated over the formed film to provide an information storage medium. The information storage medium thus obtained can reduce the glide height as compared to the prior art information storage medium owing to its excellent super flatness. Further, the information storage medium of the invention can be used for the information storage device of the ramp loading system in which the magnetic head performs inputting and outputting of signals in contact with the surface of the information storage medium without damaging the head or medium. Furthermore, the information storage medium of the invention can provide a stable surface contour also by laser texturing used for the landing zone system.

On the glass-ceramics of the above described examples is also formed a dielectric multi-layer film (e.g., TiO$_2$/SiO$_2$, Ta$_2$O$_5$/SiO$_2$ or Nb$_2$O$_5$/SiO$_2$) by the sputtering method to provide a light filter. In the light filter thus obtained, variation in the center wavelength of transmitted light due to temperature change is significantly reduced whereby an excellent wavelength resolution can be achieved.

As described above, according to the present invention, there are provided glass-ceramics suitable for use as a substrate for an information storage medium which have eliminated the disadvantages of the prior art substrates and have super flatness in the atomic level capable of coping with a low glide height or contact recording of a magnetic head necessitated by a high recording density, have reduced alkali ingredients in the glass as possible and restricted precipitation of lithium disilicate crystal which tends to produce elution of alkali and surface defects (occurrence of pits) during polishing of the substrate.

There are also provided glass-ceramics suitable for use as a substrate for a light filter which has super flatness, have no likelihood of chipping during processing, have excellent adhesion to a wavelength selecting multi-layer film and can impart sufficient compression stress to this multi-layer film.

What is claimed is:

1. Glass-ceramics containing, as a predominant crystal phase or phases, at least one selected from the group consisting of α-cristobalite, α-cristobalite solid solution, α-quartz and α-quartz solid solution, containing substantially no lithium disilicate (Li$_2$O·2SiO$_2$), lithium silicate (Li$_2$O·SiO$_2$), β-spodumene, β-eucryptite, β-quartz, mica or fluorrichterite, containing substantially no Cr ingredient or Mn ingredient, and having average linear thermal expansion coefficient within a range from +65×10$^{-7}$/° C. to +140×10$^{-7}$/° C. within a temperature range from −50° C. to +70° C., said predominant crystal phase or phases having an average crystal grain diameter of less than 0.10 μm.

2. Glass-ceramics as defined in claim 1 which have Young's modulus of 80 GPa or over.

3. Glass-ceramics as defined in claim 1 which have specific gravity within a range from 2.3 to 2.7.

4. Glass-ceramics as defined in claim 1 wherein light transmittance for plate thickness of 10 mm is 90% or over within a wavelength range from 950 nm to 1600 nm.

5. Glass-ceramics as defined in claim 1 which have bending strength of 250 MPa or over.

6. Glass-ceramics as defined in claim 1 which have Vickers hardness within a range from 600 to 800.

7. Glass-ceramics as defined in claim 1 wherein the glass-ceramics have a composition which comprises, in mass percent on oxide basis;

| SiO$_2$ | 65–75% |
| --- | --- |
| Li$_2$O | 4–less than 7% |
| K$_2$O | 0–3% |
| Na$_2$O | 0–3% |
| MgO + ZnO + SrO + BaO + CaO | 2–15% |
| Y$_2$O$_3$ + WO$_3$ + La$_2$O$_3$ + Bi$_2$O$_3$ | 0–3% |
| SnO$_2$ | 0–3% |
| P$_2$O$_5$ | 1–2.5% |
| ZrO$_2$ | 2–7% |
| Al$_2$O$_3$ | 5–9% |
| Sb$_2$O$_3$ + As$_2$O$_3$ | 0–1%. |

8. Glass-ceramics as defined in claim 1 produced by subjecting a base glass to heat-treatment at a temperature within a range from 400° C. to 600° C. for one to seven hours for nucleation and further heat-treatment at a temperature within a range from 650° C. to 750° C. for one to seven hours for crystallization.

* * * * *